(12) United States Patent
González Pantiga et al.

(10) Patent No.: US 10,683,103 B2
(45) Date of Patent: Jun. 16, 2020

(54) PASSENGER BOARDING BRIDGE

(71) Applicants: THYSSENKRUPP ELEVATOR INNOVATION CENTER S.A., Gijon (ES); thyssenkrupp AG, Essen (DE)

(72) Inventors: Juan Domingo González Pantiga, Gijón (ES); Eduardo Morán García, Gijon (ES)

(73) Assignees: THYSSENKRUPP ELEVATOR INNOVATION CENTER S.A., Gijon (ES); THYSSENKRUPP AG, Essen (DE)

( * ) Notice: Subject to any disclaimer, the term of this patent is extended or adjusted under 35 U.S.C. 154(b) by 0 days.

(21) Appl. No.: 16/470,596

(22) PCT Filed: Dec. 20, 2017

(86) PCT No.: PCT/EP2017/083773
§ 371 (c)(1),
(2) Date: Jun. 18, 2019

(87) PCT Pub. No.: WO2018/115099
PCT Pub. Date: Jun. 28, 2018

(65) Prior Publication Data
US 2020/0087006 A1 Mar. 19, 2020

(30) Foreign Application Priority Data

Dec. 22, 2016 (EP) ..................... 16380038

(51) Int. Cl.
*B64F 1/305* (2006.01)
(52) U.S. Cl.
CPC ................... *B64F 1/305* (2013.01)

(58) Field of Classification Search
CPC ....................................................... B64F 1/305
(Continued)

(56) References Cited

U.S. PATENT DOCUMENTS 3,184,772 A 5/1965 Moore
3,377,638 A 4/1968 Seipos
(Continued)

FOREIGN PATENT DOCUMENTS

CN 202371006 U 8/2012
WO 2014146758 A 9/2014

OTHER PUBLICATIONS

The Extended European Search Report issued in EP 16380038, dated Apr. 12, 2017.

*Primary Examiner* — Raymond W Addie
(74) *Attorney, Agent, or Firm* — thyssenkrupp North America, LLC

(57) ABSTRACT

A passenger boarding bridge may include a tunnel having a first tunnel section and a second tunnel section. The first and second tunnel sections may be telescopic for adjusting a length of the tunnel along a sliding direction. The passenger boarding bridge may further include bearings configured to slidably support the first and second tunnel sections relative to one another. The bearings may include a bearing rail connected to the first tunnel section a bearing sledge connected to the second tunnel section. The bearing rail may comprise a planar first horizontal bearing surface, and the bearing sledge may comprise a planar second horizontal bearing surface that is configured to slide along the planar first horizontal bearing surface as the tunnel sections telescope.

10 Claims, 3 Drawing Sheets

(58) Field of Classification Search
USPC .......................................................... 14/71.5
See application file for complete search history.

(56) References Cited

U.S. PATENT DOCUMENTS

| | | | | |
|---|---|---|---|---|
| 3,462,784 | A | * | 8/1969 | Seipos .................. B64F 1/3055 14/71.5 |
| 4,466,750 | A | | 8/1984 | Heinemann |
| 4,559,660 | A | * | 12/1985 | Lichti .................... B64F 1/3055 14/71.5 |
| 5,704,086 | A | * | 1/1998 | Hansen ................. B64F 1/3055 14/71.5 |
| 6,055,692 | A | * | 5/2000 | Pell ......................... B64F 1/305 14/71.5 |

* cited by examiner

PASSENGER BOARDING BRIDGE

CROSS REFERENCE TO RELATED APPLICATIONS

This application is a U.S. National Stage Entry of International Patent Application Serial Number PCT/EP2017/083773, filed Dec. 20, 2017, which claims priority to European Patent Application No. EP 16380038.6, filed Dec. 22, 2016, the entire contents of both of which are incorporated herein by reference.

FIELD

The present disclosure generally relates to passenger boarding bridges that connect airport terminals to aircraft.

BACKGROUND

A passenger boarding bridge of the claimed type, for example shown in WO 2014/146758 A1, connects an airplane with a terminal building via a tunnel. The tunnel may be extendible and comprises at least two tunnel sections, which can be telescoped for adjusting the length of the tunnel to the distance between an airplane door and the terminal building. The tunnel sections are connected by roller bearings to enable relative movement of the tunnel sections during telescoping. U.S. Pat. No. 3,184,772 A discloses a conventional bearing concept, that uses rollers between the two tunnel sections.

However the forces onto the bearings are that high, that enormous wear is applicable to the rollers and the bearing surfaces. This is in main caused by the nearly point or line shaped contact surfaces of the rollers and the respective bearing surface, which causes high stress on the small contact surface. The stress is also a cause for increased corrosion on the bearing rail surfaces.

Thus a need exists to reduce wear on bearings of tunnel sections of passenger boarding bridges.

DETAILED DESCRIPTION

Figure 1:
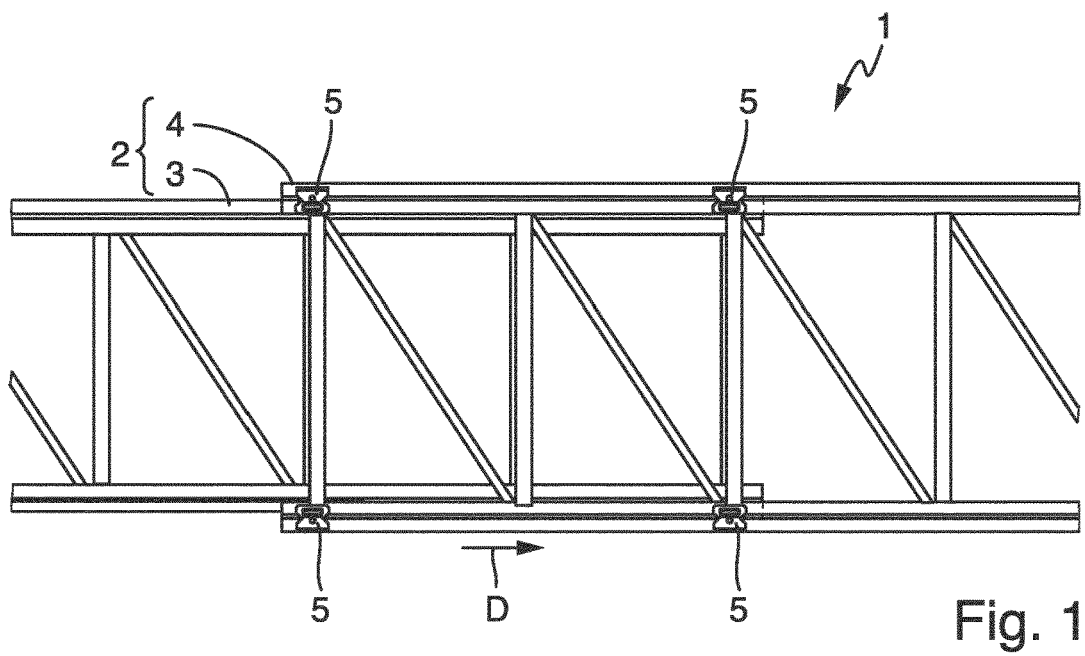
FIG. 1 is a side view of an example passenger boarding bridge showing parts of a tunnel with two tunnel sections.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The inventive passenger boarding bridge comprises a tunnel having a first tunnel section and a second tunnel section, the tunnel sections can be telescoped for adjusting the length of the tunnel along a main sliding direction, a number of bearings adapted to slidably support the tunnel sections relative to each other, having at least one bearing rail connected to the first tunnel section and at least one bearing sledge connected to the second tunnel section. The bearing rail comprises a planar first horizontal bearing surface. The bearing sledge comprises a planar second horizontal bearing surface, which is adapted to slide along the planar first horizontal bearing surface during telescoping.

The main idea is to replace the rolling rollers by a sliding sledge. Though the friction between the two tunnel sections may increase during telescoping, the surface pressure when static loads charges the bearings are massively reduced compared to the conventional roller bearings. This enables less wear, thus less corrosion and less maintenance costs. The increased friction is acceptable in view of the other advantages, also because during telescoping the bridge is not occupied by passengers and thus comparatively light in weight.

In an embodiment the bearing sledge comprises a bearing support attached to the second tunnel and a bearing shoe carrying the second horizontal bearing surface, wherein the bearing shoe is tiltably connected to the bearing support, in particular by a first hinge. The ability to tilt provides a self-adjusting mechanism to the bearing shoe. In particular the bearing shoe is tiltably connected to the bearing support along a first axis, which is aligned horizontally and perpendicular to the main sliding direction. This first axis corresponds to the axis of the main bending moments occurring in the tunnel sections during use.

In an embodiment the bearing shoe is tiltably connected to the bearing support additionally along a second axis, which is aligned horizontally and parallel to the main sliding direction, and/or along a third vertical axis. This additionally enables a self-adjusting capability of the bearing shoe in any other direction.

In an embodiment the bearing rail comprises a planar first vertical guiding surface, and the bearing sledge comprises a planar second vertical guiding surface, which is in slidable contact with the planar first vertical guiding surface. In particular during the side movement of the passenger boarding bridge heavy loads occur on the vertical guiding surfaces. The planar surfaces reduce the pressure stress on the guiding surfaces and enable also less wear.

In an embodiment that the bearing sledge comprises a guiding support attached to the second tunnel and a guiding shoe carrying the second vertical guiding surface. The guiding shoe is tiltably connected to the guiding support, in particular by a first hinge and/or by a second hinge. The tiltably connection enables a self-adjusting mechanism to the second vertical guiding surfaces. In an embodiment the guiding support can be the same part as the previously mentioned bearing support.

In an embodiment the guiding shoe is tiltably connected to the guiding support along a first axis, which is aligned horizontally and perpendicular to the main sliding direction. Additionally the bearing shoe is in particular tiltably connected to the bearing support along a second axis, which is aligned horizontally and parallel to the main sliding direction and/or along a third vertical axis. The advantages mentioned above are applicable.

In an embodiment the bearing shoe and/or the guiding shoe is connected to the bearing support by means of a first ball joint. The ball joint enables that the bearing shoe and/or the guiding shoe may tilt around all spatial axis.

In an embodiment the guiding shoe is connected to the bearing shoe by means of a second ball joint. Here in particular the bearing shoe carries the guiding shoe. So in principal the guiding shoe has the same degrees of freedom as the bearing shoe relative to the bearing support. Through the second ball joint the guiding shoe has also additional degrees of freedom relative to the bearing shoe. This enables optimum self-alignment capabilities between all involved surfaces.

In an embodiment the bearing surfaces of one bearing having at least a common planar contacting area of at least 20 $cm^2$, in particular at least 25 $cm^2$. Here the contacting area means, the common surface area of the first horizontal bearing and the second horizontal bearing surface, being in contacting to each other and being capable of transmitting normal force to each other by surface pressure.

Some of the surfaces, in particular the second bearing surface and/or the second guiding surface, may be made from a low friction material, e.g. so called low friction ceramics or so called low friction plastics, which are advantageous due to their low friction coefficient. Since the surface pressure is much lower compared to rollers, materials having a less hardness can be used.

In an embodiment, between the guiding surfaces and/or between the bearing surfaces no additional lubricant is provided. In contrast thereto conventional rollers need regularly supply of lubricant; therefore the inventive concept is more environmentally friendly and thus requires low maintenance effort.

In the scope of the present invention the term "tiltably" means, that the respective parts can be twisted relative to each other over a range of angle which is much less than 90°. The tilting is just provided for adjusting the planar bearing surface to each other (making them parallel), therefore a twisting is only necessary of some degrees smaller than 10°. In contrast to the prior art, there are provided roller bearings wherein the rollers can rotate multiple times 360°. Twisting is not rolling; rolling means that a rotational body can perform multiple rotations over an angle of more than 360°.

FIG. 1 shows a part of an inventive passenger boarding bridge 1, as in principal is disclosed e.g. in WO 2014/146758 A1. The passenger boarding bridge 1 comprises an extendible tunnel 2, having two tunnel sections 3, 4 which can be telescoped along a main sliding direction D. The tunnel sections are supported to each other by means of in sum eight bearings 5, which are subsequently described in more detail.

Figure 2A:
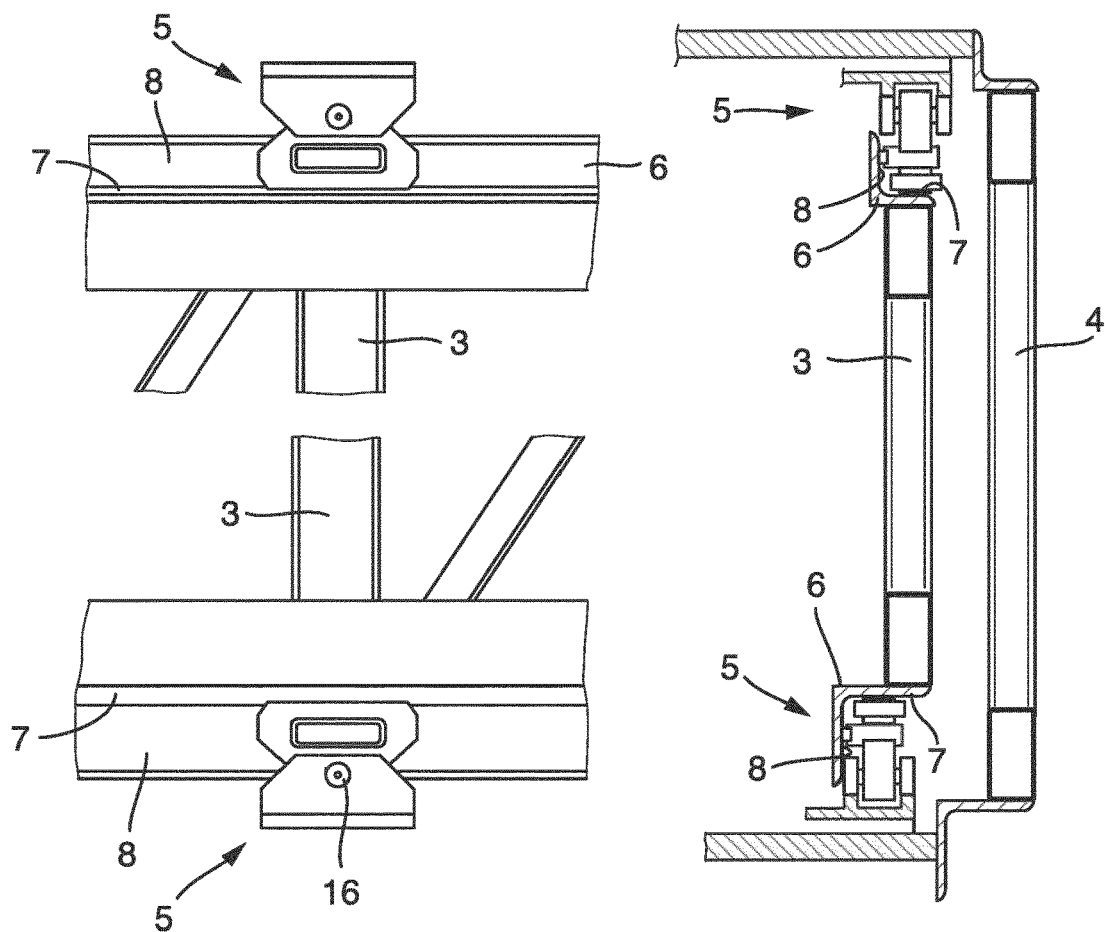
FIG. 2a is a detailed side view of the passenger boarding bridge according to FIG. 1 showing the bearings of the tunnel sections.
Figure 2B:
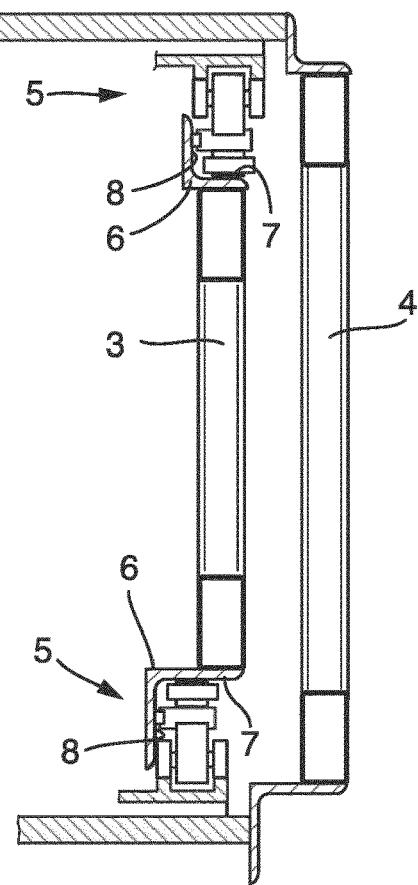
FIG. 2b is a cross-sectional view of the passenger boarding bridge according to FIG. 1 showing the bearings of the tunnel sections.

In FIG. 2 it is shown, that a bearing 5 comprises a bearing sledge 10, which can slide along a bearing rail 6. The bearing rail 6 has a planar first horizontal bearing surface 7. The bearing rail 6 is mounted to the first tunnel section 3, the bearing sledge 10 is mounted to the second tunnel section 4.

In contrast to the concepts of the prior art no rollers are provided in the bearing 5, but instead the bearing sledge 10 can slide along the bearing rail 6. Therefore the bearing sledge 10 has a planar second horizontal bearing surface 13, which rests on the planar first horizontal bearing surface 7.

Figure 3A:
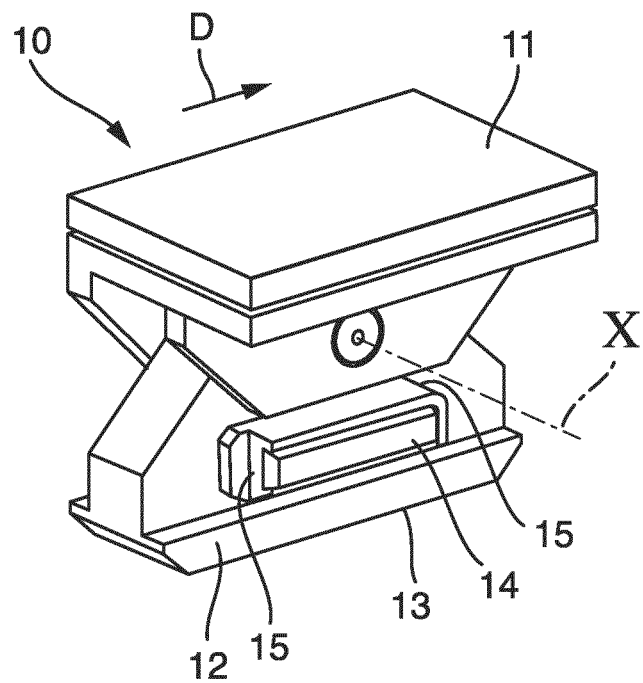
FIG. 3a is a first perspective view of an example bearing sledge of the bearing according to FIG. 2.
Figure 3B:
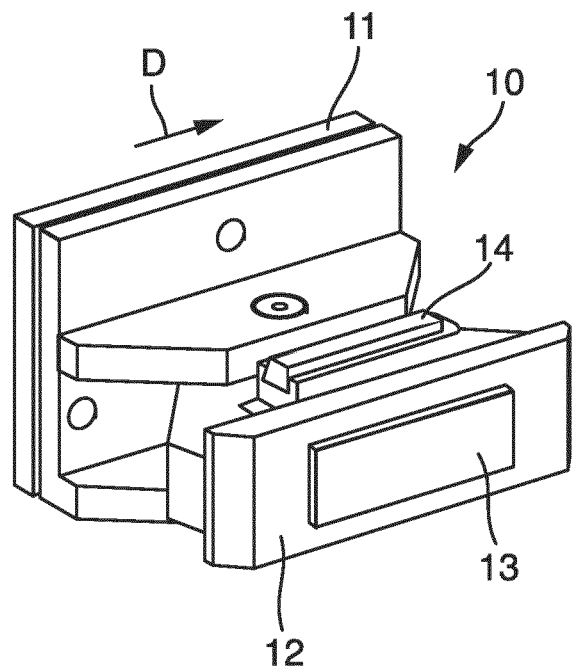
FIG. 3b is a second perspective view of an example bearing sledge of the bearing according to FIG. 2.

FIG. 3 shows details of the bearing sledge 10. The planar second horizontal bearing surface 13 defines an area of contact between the bearing sledge 10 and the bearing rail 6. Because there is a planar contact between the surfaces, the surface pressure is massively reduced compared to the conventional roller bearings having a curved second bearing surface.

During the telescoping procedure the slide friction of the inventive bearing concept may be slightly higher compared to the rolling friction of the prior art roller bearings. But the main use of a passenger boarding bridge is more a static use, in which no telescoping procedure is given; the dynamic use during telescoping is limited to some minutes per day when the bridge is tob connected to the airplane or to be disconnected from the airplane. So the disadvantage of higher friction can be accepted, also since the bridge is unloaded during (dis-)connection.

A lateral guiding is provided by the provision of a planar first vertical guiding surface 8 of the bearing rail 6 and a planar second vertical guiding surface 14 attached to the bearing sledge 10.

Figure 4:
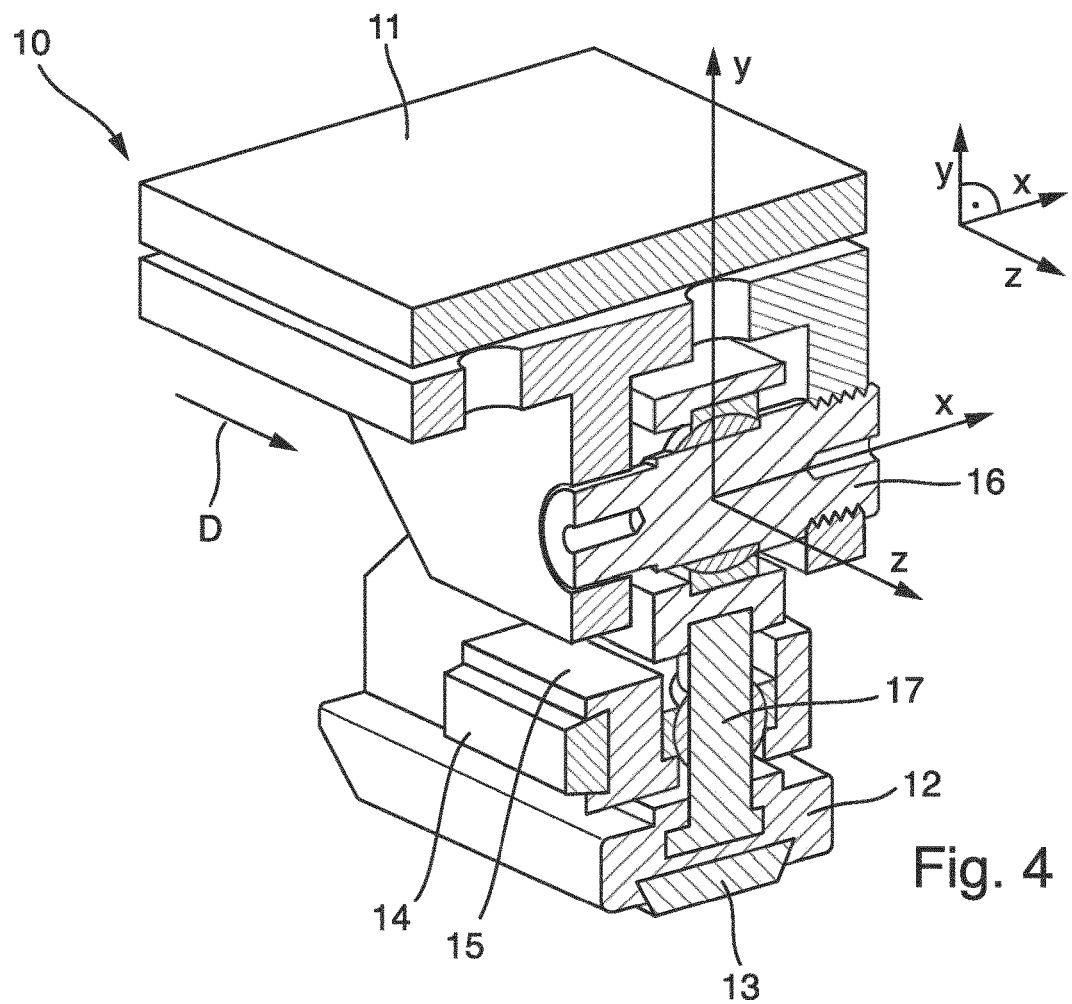
FIG. 4 is a cross-sectional view of the example bearing sledge according to FIG. 3.
Figure 5A:
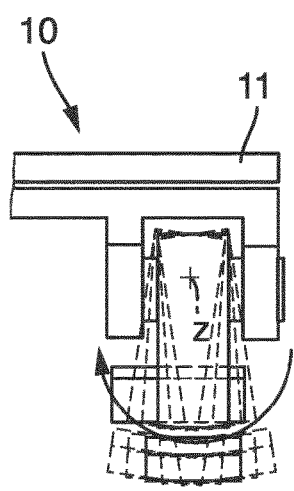
FIGS. 5a, 5b, 5c are three different views of the example bearing sledge of FIG. 3.
Figure 5B:
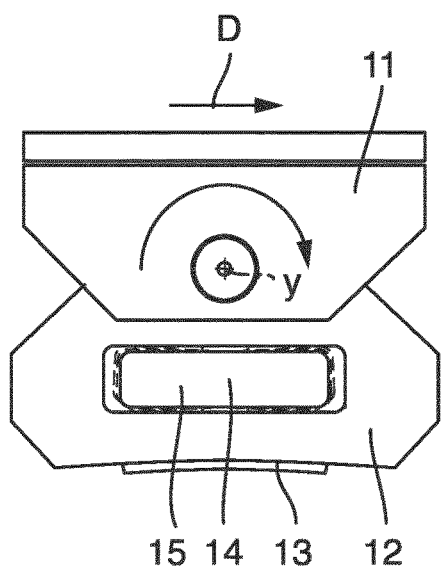
Figure 5C:
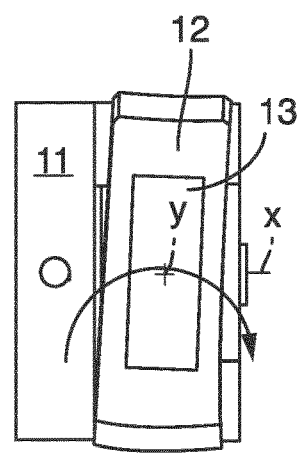

FIGS. 3 and 4 shows, that the bearing sledge 10 comprises several components, including a bearing support 11 and a bearing shoe 12. The bearing support 11 is fixed to the second tunnel section 4, the bearing shoe 12 is attached to the bearing support 11 by means of a first ball joint 16. The first ball joint 16 enables a tilting of the bearing shoe 12 relative to the bearing support 11 primary along an axis X, which is aligned horizontally and perpendicular to the main sliding direction D. Additionally the first ball joint 16 enables a tilting of the bearing shoe 12 relative to the bearing support 11 along an axis Z, which is parallel to the main sliding direction D, and along a vertical axis Y. The first ball joint provides certain degrees of freedom for the first horizontal bearing surface 13 to optimally align with the planar first horizontal bearing surface 7 (FIG. 5).

The bearing sledge 10 further comprises a guiding shoe 15, carrying the second vertical guiding surface 14. The guiding shoe 15 is connected to the bearing shoe 12 by means of a second ball joint 17, enabling a tilting of the guiding shoe 15 relative to the bearing shoe 12 along a vertical axis Y.

The guiding shoe 15 is attached to the bearing shoe 12 by means of a second ball joint 17. Due to the connection of the guiding shoe 15 at the bearing shoe 12 the guiding shoe 15 has the same degrees of freedom as the bearing shoe 12 relative to the bearing support 11.

Additionally the second ball joint 17 enables a tilting of the guiding shoe 15 relative to the bearing shoe 12 primary along the axis Z, along the axis X and along the axis Y. The second ball joint 17 provides certain degrees of freedom for the planar second vertical guiding surface 14 to optimally align with the planar first vertical guiding surface 8.

The second horizontal bearing surface 13 is constituted by a separate bearing slide pad, supported by the bearing shoe 12. The planar second vertical guiding surface 14 constituted by a separate guiding slide pad, supported by the guiding shoe 15.

LIST OF REFERENCE SIGNS 1 passenger boarding bridge
2 tunnel 3 first tunnel section
4 second tunnel section
5 bearing
6 bearing rail
7 planar first horizontal bearing surface
8 planar first vertical guiding surface
10 bearing sledge
11 bearing support/guiding support
12 bearing shoe
13 planar second horizontal bearing surface
14 planar second vertical guiding surface
15 guiding shoe
16 first hinge
17 second hinge
X x-axis
Y y-axis
Z z-axis
D main sliding direction

What is claimed is:

1. A passenger boarding bridge comprising:
a tunnel having a first tunnel section and a second tunnel section, wherein the first and second tunnel sections are telescopic for adjusting a length of the tunnel along a sliding direction; and
bearings adapted to slidably support the first and second tunnel sections relative to one another, the bearings comprising,
a bearing rail connected to the first tunnel section, wherein the bearing rail comprises a planar first horizontal bearing surface, and
a bearing sledge connected to the second tunnel section, the bearing sledge comprising,
a bearing support attached to the second tunnel section,
a bearing shoe tiltably connected to the bearing support, and
a planar second horizontal bearing surface coupled to the bearing shoe and configured to slide along the planar first horizontal bearing surface as the first and second tunnel sections telescope.

2. The passenger boarding bridge of claim 1 wherein the bearing shoe is tiltably connected to the bearing support by a first hinge.

3. The passenger boarding bridge of claim 1 wherein the bearing shoe is tiltably connected to the bearing support by a first ball joint.

4. The passenger boarding bridge of claim 1 wherein the bearing shoe is tiltably connected to the bearing support along a first axis that is aligned horizontally and perpendicular to the sliding direction.

5. The passenger boarding bridge of claim 4 wherein the bearing shoe is tiltably connected to the bearing support along a second axis that is aligned horizontally and parallel to the sliding direction, and/or along a third vertical axis.

6. The passenger boarding bridge of claim 1, wherein bearing surfaces of one of the bearings have a common planar contacting area of at least 20 cm$^2$.

7. A passenger boarding bridge comprising:
a tunnel having a first tunnel section and a second tunnel section, wherein the first and second tunnel sections are telescopic for adjusting a length of the tunnel along a sliding direction; and
bearings adapted to slidably support the first and second tunnel sections relative to one another, the bearings comprising,
a bearing rail connected to the first tunnel section, the bearing rail comprising,
a planar first horizontal bearing surface, and
a planar first vertical guiding surface, and
a bearing sledge connected to the second tunnel section, the bearing sledge comprising,
a guiding support attached to the second tunnel section,
a guiding shoe tiltably connected to the guiding support,
a planar second horizontal bearing surface that is configured to slide along the planar first horizontal bearing surface as the first and second tunnel sections telescope,
a planar second vertical guiding surface coupled to the guiding shoe and in slidable contact with the planar first vertical guiding surface.

8. The passenger boarding bridge of claim 7 wherein the bearing sledge comprises:
a bearing support attached to the second tunnel section; and
a bearing shoe carrying the planar second horizontal bearing surface, wherein the bearing shoe is tiltably connected to the bearing support,
wherein the bearing shoe is tiltably connected to the bearing support by a first ball joint,
wherein the guiding shoe is connected to the bearing shoe by a second ball joint.

9. The passenger boarding bridge of claim 7 wherein the guiding shoe is tiltably connected to the guiding support along a first axis that is aligned horizontally and perpendicular to the sliding direction.

10. The passenger boarding bridge of claim 9 wherein the bearing sledge comprises:
a bearing support attached to the second tunnel section; and
a bearing shoe carrying the planar second horizontal bearing surface, wherein the bearing shoe is tiltably connected to the bearing support,
wherein the bearing shoe is tiltably connected to the guiding support along a second axis that is aligned horizontally and parallel to the sliding direction and/or along a third vertical axis.

* * * * *